US006666277B2

(12) United States Patent
Reilly

(10) Patent No.: US 6,666,277 B2
(45) Date of Patent: Dec. 23, 2003

(54) LOW PRESSURE PNEUMATIC AND GATE ACTUATOR

(75) Inventor: Willilam J. Reilly, Langhorne, PA (US)

(73) Assignee: Victaulic Company of America, Easton, PA (US)

( * ) Notice: Subject to any disclaimer, the term of this patent is extended or adjusted under 35 U.S.C. 154(b) by 257 days.

(21) Appl. No.: 09/897,167

(22) Filed: Jul. 2, 2001

(65) Prior Publication Data

US 2002/0011342 A1 Jan. 31, 2002

Related U.S. Application Data

(63) Continuation-in-part of application No. 09/535,599, filed on Mar. 27, 2000, now Pat. No. 6,293,348.

(51) Int. Cl.[7] ........................ F16K 31/12; A62C 35/00; A62C 37/36

(52) U.S. Cl. ............................ 169/16; 169/17; 169/18; 169/42; 251/28; 251/30.05

(58) Field of Search ............................ 169/16, 17, 18, 169/19, 20, 42, 9, 22; 239/533.1, 569, 570, 572; 251/28, 30.05, 30.02

(56) References Cited

U.S. PATENT DOCUMENTS

| | | | | |
|---|---|---|---|---|
| 1,613,343 A | | 1/1927 | Clark | |
| 1,863,454 A | | 6/1932 | Rowley | |
| 2,187,906 A | | 1/1940 | Lowe | 169/17 |
| 2,695,609 A | | 11/1954 | Nourse et al. | 128/142 |
| 2,731,091 A | | 1/1956 | Robbins | 169/17 |
| 2,822,052 A | | 2/1958 | Herkimer | 169/19 |
| 3,165,115 A | | 1/1965 | Erson | 137/494 |
| 3,476,353 A | | 11/1969 | Stampfli | 251/45 |
| 3,589,445 A | | 6/1971 | Juliano | 169/17 |
| 3,595,318 A | | 7/1971 | Merdinyan | 169/17 |
| 3,727,878 A | | 4/1973 | Willms | 251/57 |
| 3,785,440 A | | 1/1974 | Shea | 169/20 |
| 3,788,400 A | | 1/1974 | Tufts | 169/11 |
| 4,263,838 A | * | 4/1981 | St. Laurent, Jr. | 91/387 |
| 4,286,668 A | | 9/1981 | McCormick | 169/22 |

(List continued on next page.)

FOREIGN PATENT DOCUMENTS

| | | | |
|---|---|---|---|
| DE | 39 40 446 | 6/1990 | A47B/46/00 |
| FR | 2 334 032 | 7/1977 | F16K/17/36 |
| WO | WO 99/59678 | 11/1999 | A62C/37/06 |

OTHER PUBLICATIONS

U.S. application No. 09/526,250, filed Mar. 16, 2000, *entitled Dry Accelerator for Sprinkler Systems* (*Reilly*).

U.S. application No. 10/060,441, filed Jan. 30, 2002, *entitled Low Pressure Electro–Pneumatic and Gate Actuator* (Reilly).

U.S. application No. 09/810,631, filed Mar. 16, 2001, *entitled Low Pressure Actuator for Dry Sprinkler System* (Reilly).

*Primary Examiner*—Davis D. Hwu
(74) *Attorney, Agent, or Firm*—Synnestvedt & Lechner LLP

(57) ABSTRACT

A pneumatic actuator having AND gate logic characteristics is disclosed. The actuator has three chambers each divided into two chamber portions by respective flexible diaphragms. One of the diaphragms acts as a valve closing member and controls the flow of a pressurized fluid through the actuator to actuate an associated device when fluid flow is permitted. The other two diaphragms are in mechanical contact with one another and in hydraulic communication with the one diaphragm and thereby control its motion, keeping it normally closed and preventing fluid flow but allowing it to move into an open position permitting fluid flow and actuation of the associated device only when each of the two diaphragms are subject to separate, concurrent drops in pressure which allows both of them to deflect away from the one diaphragm.

17 Claims, 3 Drawing Sheets

U.S. PATENT DOCUMENTS

| | | | | | |
|---|---|---|---|---|---|
| 4,570,719 | A | | 2/1986 | Wilk | 169/20 |
| 4,615,353 | A | | 10/1986 | McKee | 137/102 |
| 4,854,342 | A | | 8/1989 | Polan | 137/516.29 |
| 4,971,288 | A | * | 11/1990 | Tanner et al. | 251/57 |
| 5,096,266 | A | | 3/1992 | Skantar | 303/82 |
| 5,294,090 | A | | 3/1994 | Winnike | 251/36 |
| 5,439,028 | A | | 8/1995 | Meyer et al. | 137/556 |
| 5,899,277 | A | | 5/1999 | Eisenbeiss et al. | 169/46 |
| 5,967,173 | A | * | 10/1999 | Kingsford et al. | 137/312 |
| 6,000,473 | A | | 12/1999 | Reilly | 169/17 |
| 6,029,749 | A | | 2/2000 | Reilly et al. | 169/17 |
| 6,068,057 | A | | 5/2000 | Beukema | 169/22 |
| 6,138,766 | A | | 10/2000 | Finnerty et al. | 169/14 |
| 6,158,520 | A | | 12/2000 | Reilly et al. | 169/17 |
| 6,293,348 | B1 | | 9/2001 | Reilly | 169/16 |
| 6,378,616 | B2 | | 4/2002 | Reilly | 169/17 |
| 6,536,533 | B2 | * | 3/2003 | Reilly | 169/16 |

* cited by examiner

LOW PRESSURE PNEUMATIC AND GATE ACTUATOR

RELATED APPLICATION

This is a continuation-in-part application of U.S. application Ser. No. 09/535,599, filed Mar. 27, 2000 now U.S. Pat. No. 6,293,348.

FIELD OF THE INVENTION

This invention relates to actuators for controlling the operation of valves and especially for valves used in sprinkler systems for fire protection.

BACKGROUND OF THE INVENTION

Automatic sprinkler systems for fire protection of structures such as office buildings, warehouses, hotels, schools and the like are required when there is a significant amount of combustible matter present. The combustible matter may be found in the materials from which the building itself is constructed, as well as in the building contents, such as furnishings or stored goods.

Of the various types of automatic sprinkler systems available, the preaction systems find widespread use. Preaction systems use an actuator which responds to a combination of signals from different detectors to trip a valve which provides water to the sprinkler piping network. Similar to the so-called "dry-pipe" systems, the piping network in the preaction system is normally filled with air or nitrogen (and not water) prior to actuation. The preaction system can thus be used in unheated environments which are subject to below freezing temperatures without fear of pipes bursting due to water within the pipes expanding upon freezing.

When sufficiently pressurized, the behavior of the gas within the piping network may be used to indicate a fire condition and trigger actuation of the preaction system. Heat from the fire will cause sprinkler heads to open, allowing pressurized gas to escape from the piping network and resulting in a pressure drop within the system. Actuation of the system may be effectively triggered by this pressure drop.

Specifically, double interlock preaction systems are further advantageous because an alarm may be sounded to provide a warning before the sprinklers operate. Furthermore, failure, breakage or accidental opening of the sprinklers or a pipe in the piping network will not result in an unintentional discharge of water, since there is no water in the network until the system is actuated. Actuation for double interlock preaction systems requires that two or more separate signals be sensed.

Preaction systems are not without their disadvantages however. Traditional preaction systems, described above, which are triggered by a drop in air pressure within the piping network as the result of a sprinkler head opening in response to heat (along with a confirming signal from another sensor) usually maintain the sprinkler piping network at a relatively high internal pressure, typically on the order of 20% of the maximum water pressure in the system. The air pressure in such systems is used to control the release of the water to the piping network, and the valves typically operate at a mechanical advantage of about 1 to 5 air pressure to water pressure. The use of relatively high-air pressures becomes a problem with larger systems which tend to have a relatively large volume of air within the piping network. Higher air pressures and volumes require more powerful compressors, having higher capital and operating costs. Furthermore, the higher pressures mean that more air must be forced out of the piping network upon activation. The air in the network inhibits the free flow of water and, thus, increases the reaction time of the system. More air in the piping network also means that more moisture will be present, accelerating corrosion of the pipes.

There is clearly a need for a preaction sprinkler system having the ability to operate at relatively low system air pressures for providing a signal which activates the sprinkler system.

SUMMARY AND OBJECTS OF THE INVENTION

The invention concerns a purely pneumatic actuator for actuating a fire sprinkler system. The system is actuated when the actuator depressurizes a piston holding a valve controlling the flow of water to the sprinkler system closed. The actuator behaves like an AND gate in a logic circuit in that it will depressurize the piston and release the valve only when two separate pressure drops are manifest in the actuator. The actuator is thus connected to two separate sources of compressed air, one being the piping network of the sprinkler system, the other being a pilot line substantially co-located with the piping network. During a fire, heat-sensitive sprinkler heads on both networks open and release pressurized air within each network to the ambient. This causes pressure drops to occur in both networks which is sensed by the actuator. In response to the pressure drops, the actuator depressurizes the piston which allows the valve to open and supply water to the piping network for release through the open sprinkler heads onto the fire.

In the preferred embodiment, the actuator has a first chamber with a flexible first diaphragm mounted therein. The first diaphragm sealingly divides the first chamber into first and second chamber portions, both the chamber portions being in fluid communication with the cylinder. The second chamber portion has an opening providing fluid communication with the ambient, the opening being surrounded by a seat facing the first diaphragm. The first diaphragm is deflectable into sealing engagement with the seat to seal the opening when the cylinder is charged with a fluid, such as water from a pressurized source.

A second chamber having a flexible second diaphragm mounted therein which sealingly divides the second chamber into third and fourth chamber portions is preferably positioned above the first chamber. The third chamber portion is in fluid communication with a source of compressed air, for example, the pilot line network, and the fourth chamber portion is in fluid communication with the ambient. The fourth chamber portion has an aperture providing fluid communication with the first chamber portion, the aperture being surrounded by a second seat facing the second diaphragm. The second diaphragm is deflectable into sealing engagement with the second seat to seal the aperture when the third chamber portion is charged with compressed air from the pilot line network.

A third chamber having a flexible third diaphragm mounted therein and sealingly dividing the third chamber into fifth and sixth chamber portions is preferably positioned above the second chamber. The fifth chamber portion is in fluid communication with a second source of compressed fluid, for example, the piping network. An elongated plunger having one end positioned within the sixth chamber portion and engagable with the third diaphragm, and the other end positioned within the third chamber portion and engagable with the second diaphragm is slidably movable between the sixth and third chamber portions. The third diaphragm is deflectable into engagement with the one end of the plunger when the fifth chamber portion is charged with compressed air form the piping network, and the plunger is thereupon forced into engagement with the second diaphragm, thereby forcing the second diaphragm into sealing engagement with the second seat. The second diaphragm will be deflected out of engagement with the second seat only when both the fifth and the third chamber portions are vented to a lower pressure, as when sprinkler heads on both the pilot line network and the piping line network are open concurrently and vent the compressed air from these networks to the ambient. As a result, fluid pressure in each the third and fifth chamber portions falls to a predetermined value which allows fluid in the first chamber portion to enter the fourth chamber portion and exit to the ambient. This allows the first diaphragm to deflect out of engagement with the first seat and allows water to flow from the cylinder through the second chamber portion and exit to the ambient, thereby depressurizing the piston and allowing it to move within the cylinder and release the valve which moves to the open position and supplies water to the piping network.

The invention also includes a reset valve for manually resetting the sprinkler system and preventing unintentional resetting during a fire. The reset valve has a valve body and a conduit extending through the valve body. One end of the conduit is in fluid communication with the third chamber portions and the other end is vented to the ambient. A valve seat is positioned in the one end of the conduit and a valve closing member is movably mounted within the conduit adjacent to the seat. The valve closing member is movable into sealing engagement with the seat to close the reset valve. The reset valve also has means for biasing the valve closing member out of engagement with the seat when fluid pressure within the one end of the conduit falls below a predetermined value. The biasing means thereby opens the reset valve and vents the third chamber portion to the ambient. Preferably, there is an identical reset valve in fluid communication with the fifth chamber portion as well. The reset valves prevent spurious pressure surges from pressurizing either of the third or fifth chamber portions and thereby accidentally resetting the system and, thus, cutting off the water supply during a fire.

DETAILED DESCRIPTION OF THE PREFERRED EMBODIMENTS

Figure 1:
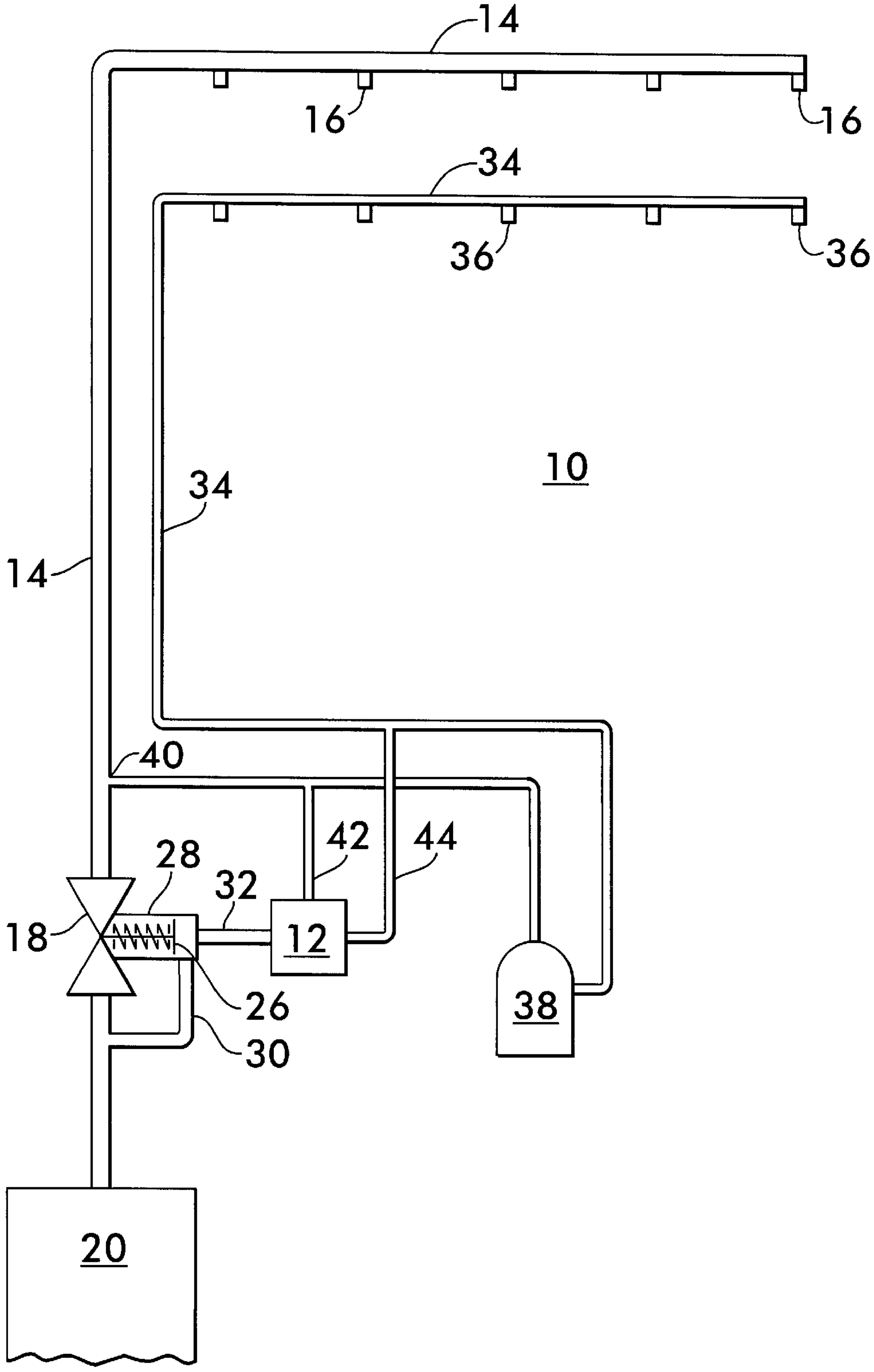
FIG. 1 is a schematic depiction of a preaction fire protection system using a low pressure pneumatic actuator according to the invention.

FIG. 1 shows a preaction fire protection sprinkler system 10 having a low pressure AND gate actuator 12 according to the invention. System 10 comprises a piping network 14 having a plurality of automatic sprinkler heads 16 which open when the air surrounding the head reaches a predetermined temperature due to a fire. Network 14 is normally dry and is connected to a valve 18 which controls the flow of water from a water supply source 20 to the network 14.

Figure 2:
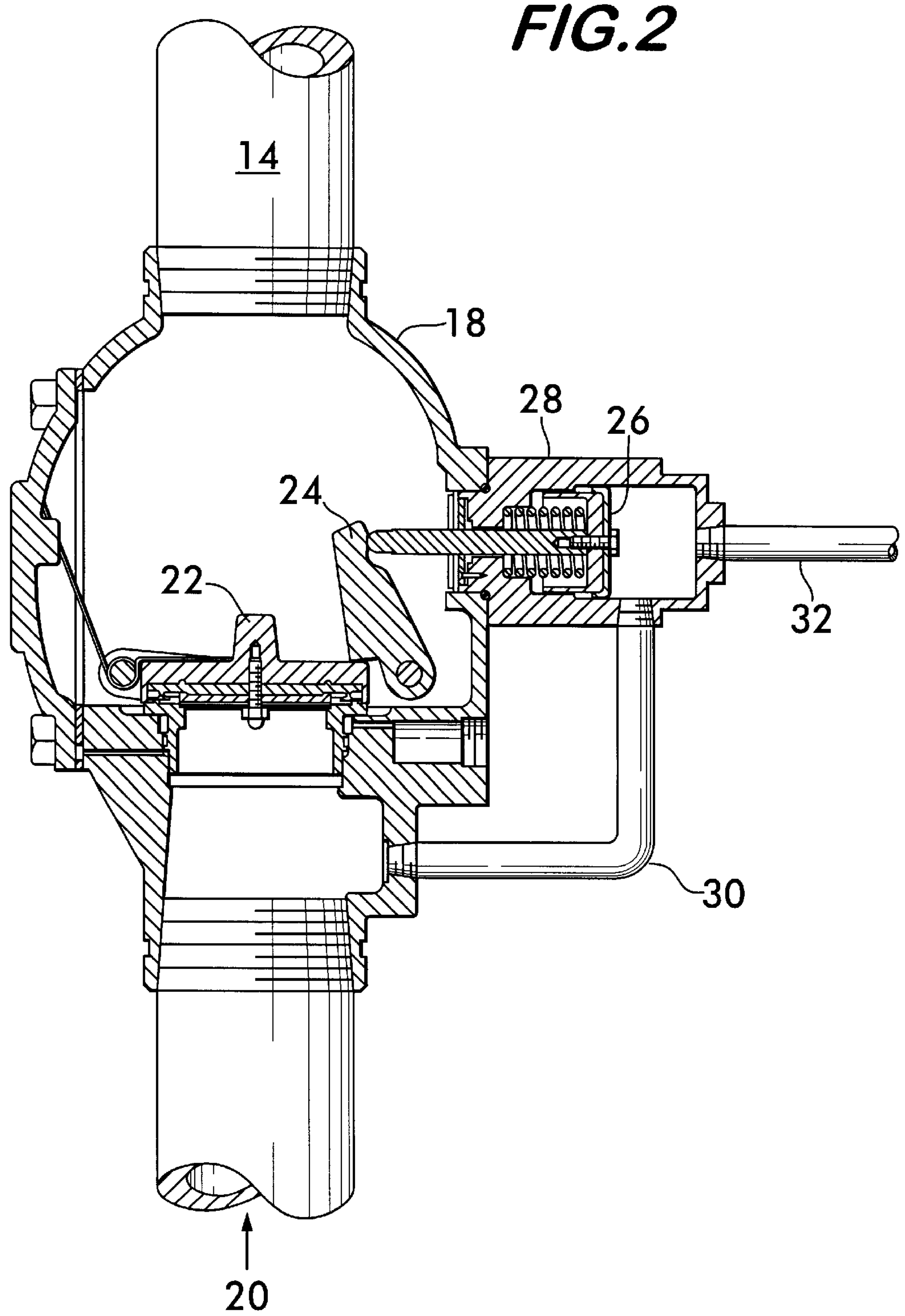
FIG. 2 is a longitudinal sectional view of a valve and control piston used in the preaction fire protection system shown in FIG. 1.

As shown in FIG. 2, the valve closing member of valve 18 is preferably a pivoting clapper 22 held in the closed position against the pressure of the water supply 20 by a latch 24 controlled by a piston 26 reciprocable within a cylinder 28. Cylinder 28 is in fluid communication with water supply 20 via a conduit 30, the water supply 20 pressurizing piston 26 to hold the latch in position keeping the clapper 22 closed. As shown in both FIGS. 1 and 2, cylinder 28 is also in fluid communication with the low pressure actuator 12 via a conduit 32, the actuator hydraulically controlling the action of the piston 26 to actuate valve 18 as described below.

Sprinkler system 10 also includes a pilot line network 34 of pipes having automatic sprinkler heads 36 distributed along the pilot line network. Similar to sprinkler heads 16, sprinkler heads 36 open in response to a fire when the air surrounding the head reaches a predetermined temperature. Unlike the piping network 14, however, the pilot line network is not in fluid communication with the water supply 20 but is in fluid communication with a supply of compressed air 38. The piping network 14 is also in fluid communication with compressed air supply 38 at a point 40 downstream of the clapper 22. Both the piping network 14 and the pilot line network 34 are connected to the low pressure actuator 12 by conduits 42 and 44 as described below.

In operation, both the piping network 14 and the pilot line network 34 act as sensors to trigger the sprinkler system in the event of a fire. Heat from the fire causes the automatic sprinkler heads 16 and 36 nearest the fire to open substantially concurrently. Concurrent opening of the heads from both the piping and pilot line networks permits a drop in the pressure of the compressed air in both networks which is sensed by the low pressure actuator 12. Upon sensing the combination of pressure drops, actuator 12 depressurizes piston 26 which releases latch 24 permitting clapper 22 to open and supply water to the piping network 14. Upon reaching the open sprinkler head or heads 16, the water is discharged onto the fire. The operation of the low pressure sensor 12 is described in detail below.

Figure 3:
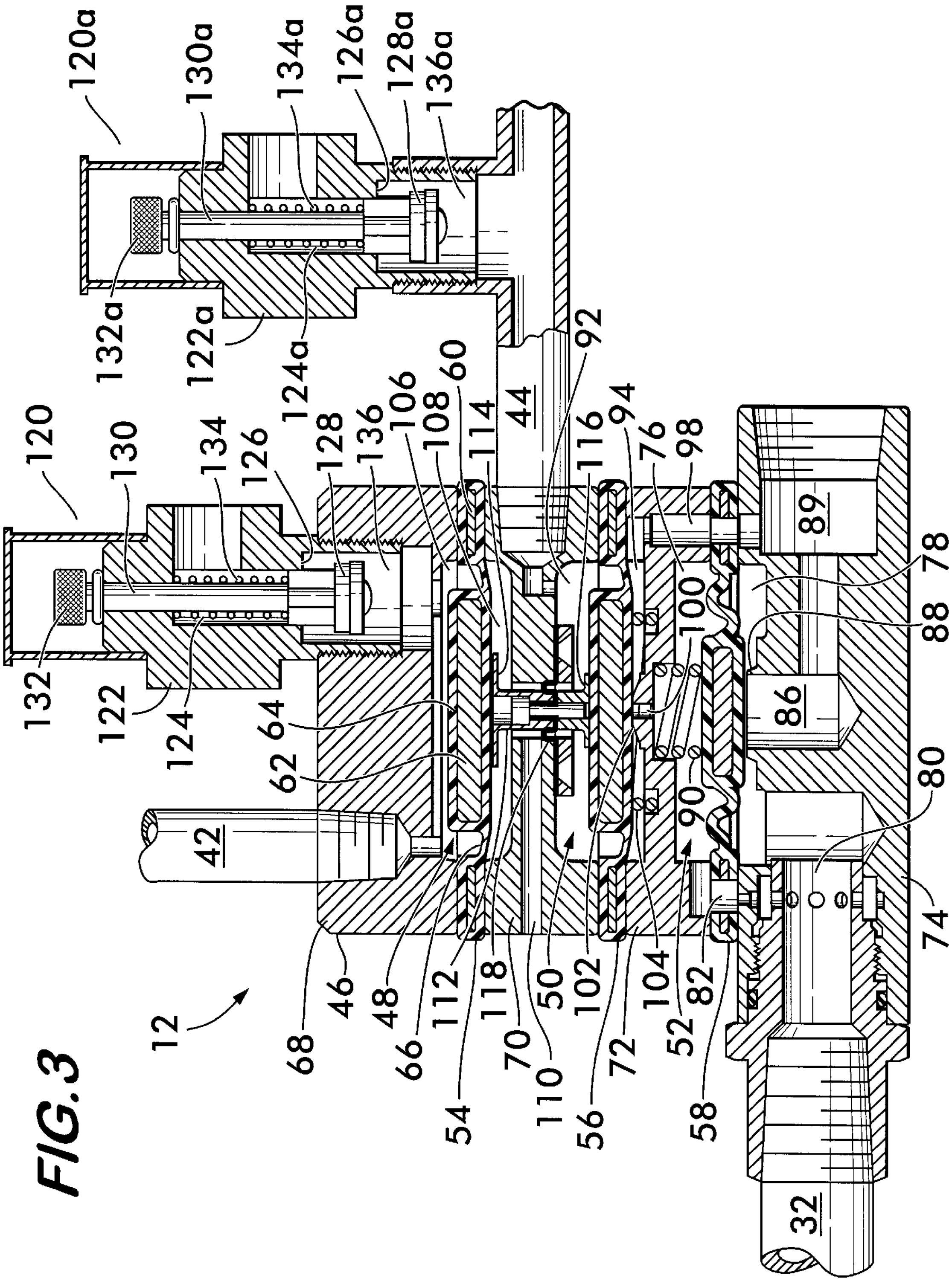
FIG. 3 is a longitudinal sectional view of a low pressure pneumatic actuator according to the invention.

As shown in cross-section in FIG. 3, low-pressure actuator 12 has a housing 46 preferably comprised of brass. Housing 46 has three chambers, a top chamber 48, a middle chamber 50 and a bottom chamber 52. Although the chambers are shown positioned one above another and are named top, middle and bottom, it is understood that the orientation of the actuator is irrelevant to its operation and the naming of its parts is for convenience and by way of example only and places no limitations on the structure or configuration of the actuator.

Each chamber is divided into upper and lower chamber portions by a respective top, middle and bottom diaphragm 54, 56 and 58. Preferably, each of the diaphragms comprise a metal ring 60 surrounding a metal plate 62. Both the plate 62 and ring 60 are encapsulated in a flexible sheath 64 and are attached to one another by a membrane portion 66 of the sheath 64 which extends between the plate and the ring. Ring 60 stiffens the perimeter of the diaphragm and provides a means for attaching it to the housing, the ring being sandwiched between various segments 68, 70, 72 and 74 forming the housing. The sheath is preferably EPDM or a similar flexible polymer and provides for a fluid tight seal between the segments. Plate 62 stiffens the diaphragm and the sheath surrounding it ensures a fluid tight seal between the diaphragm and various seats as described below. The membrane portion 66 provides flexibility allowing the diaphragm to deflect in response to fluid pressure on one side or another.

While the diaphragms as described above are preferred, it is understood by those of skill in the art that other types of diaphragms may also be used without adversely affecting the operation of the actuator.

Bottom chamber 52 is divided by bottom diaphragm 58 into an upper chamber portion 76 and a lower chamber portion 78. Both chamber portions 76 and 78 are in fluid communication with cylinder 28 through conduit 32. Conduit 32 has a large diameter duct 80 which interfaces with the lower chamber portion 78, and a smaller diameter duct 82 which connects to the upper chamber portion 76. Lower chamber portion 78 has a hole 86 surrounded by a seat 88, the hole 86 allowing the lower chamber portion to vent to the ambient through a port 89, the seat 88 being engageable by the bottom diaphragm 58 to seal the hole 86 when the force exerted by the pressure in the upper chamber portion 76 is greater than the force exerted by the pressure in the lower chamber portion 78. Preferably, a biasing means in the form of a spring 90 is positioned within upper chamber portion 76 to bias bottom diaphragm 58 into sealing engagement with seat 88.

Middle chamber 50 is divided into upper and lower chamber portions 92 and 94 respectively by middle diaphragm 56. Upper chamber portion 92 is in fluid communication with pilot line network 34 through conduit 44 (see FIG. 1), and lower chamber portion 94 is in fluid communication with the ambient through a duct 98 connecting to port 89. Lower chamber portion 94 is further in fluid communication with upper chamber portion 76 through an aperture 100. A seat 102 surrounds aperture 100, the seat being engageable by middle diaphragm 56 to seal the aperture 100. A biasing means in the form of a spring 104 is positioned within the lower chamber portion 94 to normally bias the diaphragm out of engagement with seat 102.

Top chamber 48 is divided into upper and lower chamber portions 106 and 108 by top diaphragm 54. Upper chamber portion 106 is in fluid communication with piping network 14 through conduit 42 (see FIG. 1). Lower chamber portion 108 is in fluid communication with the ambient through duct 110. An elongated plunger 112 extends between lower chamber portion 108 and upper chamber portion 92. One end 114 of the plunger is engageable with top diaphragm 54. The other end 116 of the plunger is engageable with middle diaphragm 56. The plunger is slidably movable within the housing 46, and the lower chamber portion 108 is isolated from the upper chamber portion 92 by a seal 118 surrounding the plunger 112.

Preferably, both the upper chamber portion 106 and the upper chamber portion 92 also vent to the ambient through respective reset valves 120 and 120*a*. The reset valves are substantially the same in construction and operation, and therefore, only one is described in detail. Reset valve 120 has a valve body 122 through which a conduit 124 extends providing fluid communication between the associated upper chamber portion and the ambient. A valve seat 126 is positioned at the end of the conduit which interfaces with the upper chamber portion 106, and a valve closing member 128 is movably mounted within the conduit and is movable into sealing engagement with the valve seat 126. In the example shown in FIG. 3, valve closing member 128 is mounted on the end of a shaft 130 which is slidably movable within the valve body 122, although other configurations are also feasible.

Shaft 130 extends outwardly from the valve body 122 and has a knob 132 which may be manually grasped to pull valve closing member 128 into engagement with valve seat 126. A biasing means in the form of spring 134 is positioned around shaft 130 to bias the closing member 128 out of engagement with seat 126. Preferably, conduit 124 is sized larger than the valve closing member over a region 136 between seat 126 and the upper chamber portion 106 or 92 for reasons explained below.

Low Pressure AND Gate Actuator Operation

The low pressure AND gate actuator 12 according to the invention is used in the preaction fire protection system 10 to reset the system (make it ready for actuation) and to actuate the system upon receipt of the appropriate signals. The appropriate signals preferably comprise a pressure drop in both the sprinkler piping network 14, and the pilot line network 34 which occurs in response to a fire which causes heads 16 on the piping network and heads 36 on the pilot line network to open.

System Reset Function

With compressed air being supplied to the actuator 12 from the system air supply 38, to reset the system 10, an operator pulls upwardly on the reset knobs 132 and 132*a* on the reset valves 120 and 120*a*, moving the valve closing members 128 and 128*a* against biasing spring 134 and 134*a* and seating the valve closing members against valve seat 126 and 126*a* respectively. When the valve closing members are in the unseated positions as shown in FIG. 3, compressed air normally flows around them due to the enlarged regions 136 and 136*a* of conduits 124 and 124*a*. Enlarged conduit regions 136 and 136*a* on each reset valve prevent an air pressure surge in the system from unintentionally resetting the system during a fire (and thereby cutting off the water to the sprinkler heads) by inadvertently seating the valve closing members. Because of the enlarged conduit region, the valve closing members in each valve 120 and 120*a* must be held in the seated position until the pressure within upper chamber 106 (for reset valve 120) and upper chamber 92 (for reset valve 120*a*) exerts a force on the valve closing members 128 and 128*a* which exceeds the biasing force of springs 134 and 134*a*. The springs 134, 134*a* and valve closing members 128 and 128*a* are designed such that a pressure above about 6.5 psi in respective upper chambers 106 or 92 is sufficient to keep the valve closing member seated. The reset valves are thus used to establish a relatively low pressure trip point for the system as described in more detail below.

With the reset valve 120 closed, air pressure increases in the upper chamber portion 106, deflecting top diaphragm 54 into the lower chamber portion 108. Air in the lower chamber portion 108 is preferably vented to the ambient through duct 110. The top diaphragm 54 engages end 114 of plunger 112, forcing the opposite plunger end 116 into engagement with the middle diaphragm 56 and causing it to deflect into lower chamber portion 94 against biasing spring 104. Middle diaphragm 56 sealingly engages seat 102 to close the aperture 100 between the lower chamber portion 94 and the adjacent upper chamber portion 76. Air in lower chamber portion 94 is vented to ambient through duct 98 and port 89.

Middle diaphragm 56 is also deflected into lower chamber portion 94 by air pressure from the pilot line network 34 entering the upper chamber portion 92 through conduit 44. Because conduit 44 also preferably has a reset valve 120*a* substantially identical to reset valve 120, upper chamber portion 92 is thus pressurized with air only when knob 132*a* is pulled to engage valve closing member 128*a* with seat 126*a* and held in place until sufficient pressure is reached within chamber portion 92 to keep the reset valve 120*a* closed. The pressure is preferably the same as for reset valve 120, but could also be higher or lower, thus, yielding a different trip point pressure for the system. Together the top and middle diaphragms 54 and 56 provide the AND gate logic function of the actuator 12 in that both diaphragms must be allowed to independently deflect to allow the lower diaphragm 58 to unseat and open aperture 100 to actuate the main valve 18 supplying water to the sprinkler heads as described further below. Either diaphragm alone, however, can exert sufficient force to keep the bottom diaphragm seated and prevent actuation of the system.

Bottom diaphragm 58 is normally biased into engagement with seat 88 by spring 90, thus, sealing hole 86 which would otherwise vent the lower chamber portion 78 to the ambient through port 89. As shown in FIGS. 1 and 2, water pressure taken from upstream of valve 18 through conduit 30 pressurizes the piston 26 within cylinder 28 into engagement with latch 24, keeping clapper 22 closed and cutting water off from the sprinkler piping network 14. The cylinder 28 is in fluid communication with lower chamber portion 78 of actuator 12 through conduit 32, and with upper chamber portion 76 through the small diameter duct 82 fed from conduit 32. Water pressure within the cylinder 28 which keeps clapper 22 closed also forces bottom diaphragm 58 against seat 88 to close hole 86. Specifically the water pressure in upper chamber 76 exerts greater force on the diaphragm than the same pressure in lower chamber portion 78 since the water pressure in the lower chamber portion 78 does not act over the entire area of the diaphragm as it does in the upper chamber portion 76. This is because the central portion of diaphragm 58 is exposed to atmospheric pressure through hole 86 when the diaphragm 58 is seated against seat 88, and the water pressure within chamber 78 cannot act against this central portion isolated by seat 88.

The system is now set and ready to supply water to sprinkler heads 16 as called for to suppress a fire.

System Actuation

Heat from a fire will cause sprinkler heads 16 on the piping network 14 and sprinkler heads 36 on the pilot line network 34 in the immediate vicinity of the fire to open. This allows compressed air within both the piping network and the pilot line network to vent to the ambient, causing a pressure drop in both networks. As shown in FIGS. 1 and 3, the upper chamber portion 106 is in fluid communication with the piping network 14 through conduit 42 and the upper chamber portion 92 is in fluid communication with the pilot line network 34 through conduit 44. Pressure drops in each network will thus be communicated to the respective associated chamber portions 106 and 92 within the actuator 12. (The system would work equally well if upper chamber portion 106 were in fluid communication with the pilot line network and the upper chamber portion 92 were in fluid communication with the piping network. The actual connections shown and described are by way of example only and are not intended as limiting in any way.)

When the pressure in each chamber portion drops to a predetermined value (preferably about 6.5 psi), the reset valves 120 and 120*a* open (valve closing elements 128 and 128*a* unseat from seats 126 and 126*a* and are biased into enlarged conduit regions 136 and 136*a*) venting both upper chamber portions 106 and 92 to the ambient and causing a rapid pressure drop in both chamber portions. As the pressure in upper chamber portions 106 and 92 drops, it falls below a second predetermined value which allows biasing spring 104 to deflect both the top and middle diaphragms 54 and 56 upwardly, unseating middle diaphragm 56 from seat 102 and opening aperture 100. This allows water under pressure in upper chamber portion 76 to flow through aperture 100, into lower chamber portion 94 and out to the ambient through duct 98 and port 89. With the water pressure in upper chamber portion 76 thus relieved, the bottom diaphragm 58 is deflected by water pressure within lower chamber portion 78, the bottom diaphragm is unseated from seat 88, allowing water from conduit 32 to vent to the ambient. Deflection of the bottom diaphragm 58 away from seat 88 is ensured by making the diameter 80 of conduit 32 feeding lower chamber portion 78 relatively large as compared with the diameter of duct 82 which feeds the upper chamber portion 76. Despite being at the same pressure, water from conduit 32 cannot flow fast enough through small diameter duct 82 to pressurize upper chamber portion 76 and deflect the bottom diaphragm 58 into engagement with seat 88.

Conduit 32 is in fluid communication with cylinder 28 (see also FIG. 2). Thus, when the conduit 32 is vented to ambient by the action of bottom diaphragm 58, piston 26 is depressurized. This releases latch 24 allowing clapper 22 to open under the pressure of water source 20 and supply water to the piping network 14 where the water is released from the open sprinkler heads 16 onto the fire.

Based upon the foregoing description of the actuator and its operation, it is possible to view the actuator as comprised of a plurality of pressure actuated valves. Bottom chamber 52 and its associated bottom diaphragm 58 comprise an example of a first pressure actuated valve controlling the flow of the pressurized fluid through the actuator. This first valve has a first valve closing member (diaphragm 58) with opposite sides both in fluid communication with the pressurized fluid. The first valve is normally closed and prevents the fluid flow which depressurizes the piston 26. The first valve closing member opens to permit the depressurizing flow when the fluid pressure on one side of the first valve closing member exceeds the fluid pressure on the opposite side of the first valve closing member.

The middle chamber 50 and its middle diaphragm 56 comprise an example of a second pressure actuated valve controlling the fluid pressure on the opposite side of the first valve closing member. The second valve has a second valve closing member (diaphragm 56) which is movable from a closed position, which maintains fluid pressure on the opposite side of the first valve closing member, to an open position, which releases fluid pressure from the opposite side of the first valve closing member. The second valve closing member has a side in fluid communication with a first source of compressed fluid and is movable from the closed to the open position in response to a decrease in pressure of the first source of compressed fluid.

The top chamber 48 and its top diaphragm 54 comprise an example of a third pressure actuated valve. The third pressure actuated valve has a third valve closing member (diaphragm 54) with a mechanical link to the second valve closing member. The third valve closing member has a side in fluid communication with a second source of compressed fluid and is movable from a first position which maintains a force through the mechanical link onto the second valve closing member (thereby maintaining the second valve closing member in the closed position) to a second position removing the force from the second valve closing member. The third valve closing member moves to the second position in response to a decrease in pressure of the second source of compressed fluid. However, both the third and second valve closing members move into their respective second and open positions only upon a concurrent pressure decrease of both the first and second sources of compressed fluid, as occurs when both the pilot line network 34 and the piping network 14 are vented in the event of a fire. Motion of both the second and third valve closing members allows the first valve closing member to move into its open position and permit flow of the pressurized fluid through the actuator, thereby depressurizing piston 26 and triggering the sprinkler system.

Use of the actuator according to the invention provides the following advantages. First, the system is entirely pneumatic, thus eliminating dependence on electrical power for actuation. Once set, the system will continue to maintain its ready state and operate even during an electrical power failure. Second, the sprinkler system may operate at a relatively low air pressure, the air pressure design parameters being chosen independently of the source water pressure needed. This is made possible by controlling the ratio of the area of the middle diaphragm 56 to the cross-sectional area of the aperture 100. By keeping this ratio relatively large, for example, substantially greater than 8/1, a modest air pressure may be used to control a much larger water pressure. Preferably, the ratio is on the order of 20/1 or greater and may range between 20/1 and 700/1 in practical applications. Other ranges of this area ratio, for example, from about 20/1 to about 100/1 or 20/1 to about 600/1 are also useful in practical sprinkler system designs. A preferred embodiment of the actuator uses a ratio of about 528/1. For the various ranges of ratios described above, the system air pressure is effectively independent of the system water pressure. Thus, regardless of the system water pressure (typically 100–120 psi) the system air pressure may be kept relatively low (preferably about 10 psig maximum), and the volume of air in the piping network 14 may be kept to a minimum. This results in less corrosion due to the presence of water vapor in the piping system. Furthermore, water traveling from the source to the sprinkler heads also will arrive sooner because there will be less air under lower pressure to displace out of the system. Third, the actuator acts as an AND gate in a logic circuit in that both the top diaphragm 54 and middle diaphragm 56 must deflect for actuation to occur. Since the top diaphragm is in fluid communication only with the piping network 14 and the middle diaphragm is in fluid communication only with the pilot line network 34, depressurization must occur in both the piping network and the pilot line network for actuation to occur. Inadvertent depressurization in either network alone, such as may occur if a sprinkler head is damaged, will not trip the system in error. Fourth, unintended resetting of the system, for example, during a fire, is prevented by the use of the reset valves 120 and 120*a*, which must be manually held in place until sufficient pressure is achieved to hold the valve closing members 128 and 128*a* seated. This is accomplished by the enlarged conduit regions 136 and 136*a* which permit relatively large surges of compressed air to flow without closing the reset valves and shutting down the system. Fifth, the reset valves also eliminate the need for auxiliary means to accelerate system activation since they rapidly depressurize the chamber portions with which they are associated upon opening.

What is claimed is:

1. A pneumatic actuator for depressurizing a piston reciprocable within a cylinder, said actuator comprising:

a first chamber having a flexible first diaphragm mounted therein and sealingly dividing said first chamber into first and second chamber portions, both said chamber portions being in fluid communication with said cylinder, said second chamber portion having an opening providing fluid communication with the ambient and surrounded by a seat facing said first diaphragm, said first diaphragm being deflectable into sealing engagement with said seat to seal said opening when said cylinder is charged with a fluid;

a second chamber having a flexible second diaphragm mounted therein and sealingly dividing said second chamber into third and fourth chamber portions, said third chamber portion being in fluid communication with a source of compressed fluid, said fourth chamber portion being in fluid communication with the ambient and having an aperture providing fluid communication with said first chamber portion, said aperture being surrounded by a second seat facing said second diaphragm, said second diaphragm being deflectable into sealing engagement with said second seat to seal said aperture when said third chamber portion is charged with a compressed fluid; and a third chamber having a flexible third diaphragm mounted therein and sealingly dividing said third chamber into fifth and sixth chamber portions, said fifth chamber portion being in fluid communication with a second source of compressed fluid, an elongated plunger having one end positioned within said sixth chamber portion and engagable with said third diaphragm, the other end of said plunger being positioned within said third chamber portion and engagable with said second diaphragm, said third diaphragm being deflectable into engagement with said one end of said plunger when said fifth chamber portion is charged with a compressed fluid, said plunger being thereupon forced into engagement with said second diaphragm and thereby forcing said second diaphragm into sealing engagement with said second seat, said second diaphragm being deflected out of engagement with said second seat only when both said fifth and said third chamber portions are vented to lower the fluid pressure in each said third and fifth chamber portions to a predetermined value, fluid in said first chamber portion being permitted to enter said fourth chamber portion and exit to the ambient, thereby allowing said first diaphragm to deflect out of engagement with said first seat and allowing fluid to flow from said cylinder through said second chamber portion and exit to the ambient thereby depressurizing said piston and allowing it to move within said cylinder.

2. A pneumatic actuator according to claim 1, further comprising a reset valve comprising:

a valve body;

a conduit extending through said valve body having one end in fluid communication with one of said third and said fifth chamber portions and the other end vented to the ambient;

a valve seat positioned in said one end of said conduit;

a valve closing member movably mounted within said conduit adjacent to said seat and movable into sealing engagement with said seat to close said reset valve; and means for biasing said valve closing member out of engagement with said seat when fluid pressure within said one end of said conduit falls below a predetermined value thereby opening said reset valve and venting one of said third and said fifth chamber portions to the ambient.

3. A pneumatic actuator according to claim 2, wherein said reset valve further comprises a manual reset knob attached to said valve closing member and extending from said valve body, said manual reset knob being manually movable to move said valve closing member against said biasing means into engagement with said valve seat thereby closing said conduit, said valve closing member remaining engaged with said seat as long as fluid pressure within said one end of said conduit is above said predetermined value.

4. A pneumatic actuator according to claim 3, wherein said valve closing member is positioned between said valve seat and said one chamber portion, said one end of said conduit between said valve seat and said one chamber portion being sized relatively larger than said valve closing member thereby allowing fluid to flow around said valve closing member and through said conduit when said valve closing member is not engaged with said seat regardless of the fluid pressure within said conduit.

5. A pneumatic actuator according to claim 4, wherein said biasing means comprises a spring positioned within said conduit downstream of said valve closing member, said spring engaging said valve closing member and having a predetermined spring constant for biasing said valve closing member out of engagement with said valve seat when fluid pressure within said one end of said conduit falls below a predetermined value.

6. A pneumatic actuator according to claim 2, wherein said predetermined value of fluid pressure is between about 4 psi and about 10 psi.

7. A pneumatic actuator according to claim 6, wherein said predetermined value of fluid pressure is about 6.5 psi.

8. A pneumatic actuator according to claim 1, further comprising a biasing means positioned within said first chamber, said biasing means engaging and biasing said first diaphragm into engagement with said seat.

9. A pneumatic actuator according to claim 1, further comprising a biasing means positioned within said second chamber, said biasing means engaging and biasing said second diaphragm away from said second seat.

10. A pneumatic actuator according to claim 1, wherein said sixth chamber portion is in fluid communication with the ambient.

11. A pneumatic actuator according to claim 1, wherein said aperture providing fluid communication between said first and said fourth chamber portions has a substantially smaller cross sectional area than the area of said second diaphragm thereby allowing a relatively low fluid pressure on one side of said second diaphragm opposite to said aperture to deflect said aperture into engagement with said second seat against a relatively higher fluid pressure in said first chamber portion.

12. A pneumatic actuator according to claim 11, wherein the area of said second diaphragm is relatively larger than the cross sectional area of said aperture so as to allow the fluid pressure necessary to maintain said second diaphragm seated against said second seat against fluid pressure within said first chamber portion to be established substantially independently of the pressure of said fluid in said first chamber portion.

13. A pneumatic actuator according to claim 11, wherein the ratio of said area of said second diaphragm to said cross-sectional area of said aperture is greater than about 20/1.

14. A pneumatic actuator according to claim 13, wherein the ratio of said area of said second diaphragm to said cross-sectional area of said aperture is between about 20/1 and about 700/1.

15. A pneumatic actuator according to claim 14, wherein the ratio of said area of said second diaphragm to said cross-sectional area of said aperture is between about 20/1 and about 100/1.

16. A pneumatic actuator according to claim 14, wherein the ratio of said area of said second diaphragm to said cross-sectional area of said aperture is between about 20/1 and about 600/1.

17. A pneumatic actuator according to claim 1, further comprising:

a first duct providing said fluid communication between said cylinder and said second chamber portion, said first duct having a first diameter; and a second duct connected between said first duct and said first chamber portion, said second duct having a second diameter relatively smaller than said first diameter and operating to restrict fluid flow into said first chamber relative to said second chamber.

* * * * *